United States Patent [19]
Schneider

[11] Patent Number: 5,640,848
[45] Date of Patent: Jun. 24, 1997

[54] MULTI-CYLINDER INTERNAL COMBUSTION ENGINE

[75] Inventor: Klaus Schneider, Tiefenbronn, Germany

[73] Assignee: Dr. Ing. h.c.F. Porsche AG, Weissach, Germany

[21] Appl. No.: 535,824

[22] Filed: Sep. 28, 1995

[30] Foreign Application Priority Data

Oct. 5, 1994 [DE] Germany ............... 44 35 555.6

[51] Int. Cl.⁶ .................................................. F02K 9/00
[52] U.S. Cl. ................................... 60/278; 123/568
[58] Field of Search ................ 60/278, 284; 123/568, 123/570

[56] References Cited

U.S. PATENT DOCUMENTS

| | | | |
|---|---|---|---|
| 4,031,867 | 6/1977 | Yasuda et al. | 123/568 |
| 4,119,071 | 10/1978 | Hattori | 123/568 |
| 4,328,781 | 5/1982 | Morita | 123/570 |
| 4,492,209 | 1/1985 | Otani et al. | 123/568 |

FOREIGN PATENT DOCUMENTS

| | | | |
|---|---|---|---|
| 2655382 | 6/1991 | France . | |
| 2696787 | 4/1993 | France . | |
| 2643114 | 6/1977 | Germany | 123/570 |

OTHER PUBLICATIONS

European Search Report Jan. 17, 1996.

*Primary Examiner*—John T. Kwon
*Attorney, Agent, or Firm*—Evenson McKeown Edwards & Lenahan, PLLC

[57] ABSTRACT

A multi-cylinder internal combustion engine with a vacuum and an exhaust gas system is provided with a feed device for secondary air into the exhaust gas system and with an external exhaust gas return. The lines required for this are integrated into the housing to a substantial extent and are used for feeding secondary air during the warm-up phase as well as for subsequent exhaust gas return.

22 Claims, 4 Drawing Sheets

MULTI-CYLINDER INTERNAL COMBUSTION ENGINE

BACKGROUND AND SUMMARY OF THE INVENTION

The invention relates to a multi-cylinder internal combustion engine with an aspiration and exhaust gas system and a feed device for secondary air for the exhaust gas system, having a cylinder head with at least one outlet conduit per cylinder, having respectively at least one secondary conduit, integrated in the cylinder head and terminating in the outlet conduit and having at least one collecting line integrated into the housing of the internal combustion engine, from which the secondary conduits originate.

In some cases very considerable intervention in the exhaust gas train and the combustion process are required to be able to meet the present and future legal exhaust gas requirements for internal combustion engines. Feeding in secondary air and an external exhaust gas return are two known processes for improving the pollution content.

An internal combustion engine is known from U.S. Pat. No. 4,727,717, wherein secondary conduits formed in the cylinder head terminate in the outlet conduits and are connected with a collecting line integrated into the housing of the internal combustion engine. Fresh air is supplied to the exhaust gas system via this collecting line and the secondary conduits terminating in the outlet conduits in order to permit a more rapid heating of an exhaust gas catalytic converter. In the process the proportions of combustible components in the exhaust gas, present because of the richer fuel-air mixture in the warm-up phase of the engine, are oxidized with the addition of secondary air, release heat and are used in this manner for accelerating the warm-up of the catalytic converter.

External exhaust gas return is another form of improving or reducing emissions. In this case a portion of the exhaust gases is returned into the vacuum system of the internal combustion engine as a function of defined operational ranges of the internal combustion engine. By means of this external exhaust gas return, relatively cold exhaust gas is mixed with the combustion air provided the internal combustion engine, by means of which the $NO_x$ generation is reduced because of the effect of the returned exhaust gas. A portion of the exhaust gas is taken from the exhaust gas train of the internal combustion engine in the process and is supplied to the vacuum system via an exhaust gas return valve.

It is an object of the invention to design an internal combustion engine in such a way that both systems of emission improvement, the secondary air feed and the external exhaust gas return, can be operated with the lowest possible structural outlay. In this case both systems for emission improvement are intended to be usable with the least possible outlay for lines.

This object is attained in accordance with the invention by providing an arrangement wherein the secondary conduits and the collecting line are used for the return of exhaust gas into the vacuum system as a function of the operational range of the internal combustion engine. By means of this "dual" use of the secondary conduits provided for feeding secondary air into the exhaust gas system and the collecting line for exhaust gas return into the vacuum system the line outlay for the internal combustion engine is considerably reduced. Not only is some line length per se saved because of the "dual" use of portions of the secondary air feed system, but in addition the almost complete integration of both emission-improving measures is possible by running the lines inside the engine housing. The appropriate conduits can be formed by using existing hollow chambers or by integration into correspondingly designed housing components. Because of this it is possible to omit elaborate external line systems. The conduits integrated into the housing can be made without considerable extra effort along with the production of the crankcase or the cylinder head. In this case it is possible to produce these conduits at least partially in the casting mold without having to use metal-cutting processes. Furthermore, an effect on the disposition of add-on components to the engine housing is impossible because of the integration of the conduits.

The collecting lines integrated into the housing can be designed particularly simply, using a production technique wherein they are cut into a flange face of the cylinder head which is used for connecting the exhaust gas manifold and where they are covered by a contact surface of the exhaust gas manifold. Therefore the collecting line should be embodied as a depression or groove, open at the top, in the course of producing the cylinder head, and can already be formed when the casting mold is made. The sole metal-cutting treatment required for the collecting line is the treatment of the flange face independently thereof.

There is also a space-saving integration into the housing here, particularly if this collecting line is connected with the valves (exhaust gas return valve or secondary air valve) by means of a connecting circuit extending in the housing between two adjoining cylinder bores. This connecting circuit can also be produced by means of a simple production technique in a casting mold without metal-cutting production steps.

The extensive omission of metal-cutting treatments and the integration of the conduits in the housing of the internal combustion engine is furthermore attained in an advantageous manner if the connecting conduit to the collecting line, formed in the cylinder head, terminates in a housing recess in the crankcase which can also be produced by the embodiment of the casting mold.

The production without metal-cutting steps of this housing recess in the crankcase is made easier if it is open toward the cylinder head, so that the connection between the connecting conduit in the cylinder head and the housing recess in the crankcase is located in the flange face between these two components. Sealing of the connection is then provided by means of the usual sealing between the crankcase and the cylinder head.

By attachment of the exhaust gas return valve and the secondary air valve to the exterior of the housing of the internal combustion engine, compact dimensions and a simple structural design of the housing can be made possible in a meaningful compromise. The external placement of the two valves takes up a relatively little structural space in comparison with two separate and external whole systems. However, internal placement would mean a considerable additional structural outlay, which would lead to a considerable cost increase in the production process and to problems in regard to rigidity or weight optimization.

The external structural space required by the valves is kept small if the valves are disposed at a common connecting face on the housing and if connections to the collecting line and to the vacuum system exist from this connecting face. Furthermore, the treatment effort is kept small because of the common connecting face.

If the internal combustion engine with integrated exhaust gas return and secondary air feeding is embodied as a two-line internal combustion engine, a connection can be achieved in a simple and cost-effective manner by means of a single connecting line, so that the amount of valves is minimized along with the greatest possible integration of the conduits into the housing.

Other objects, advantages and novel features of the present invention will become apparent from the following detailed description of the invention when considered in conjunction with the accompanying drawings.

DETAILED DESCRIPTION OF THE DRAWINGS

Figure 1:
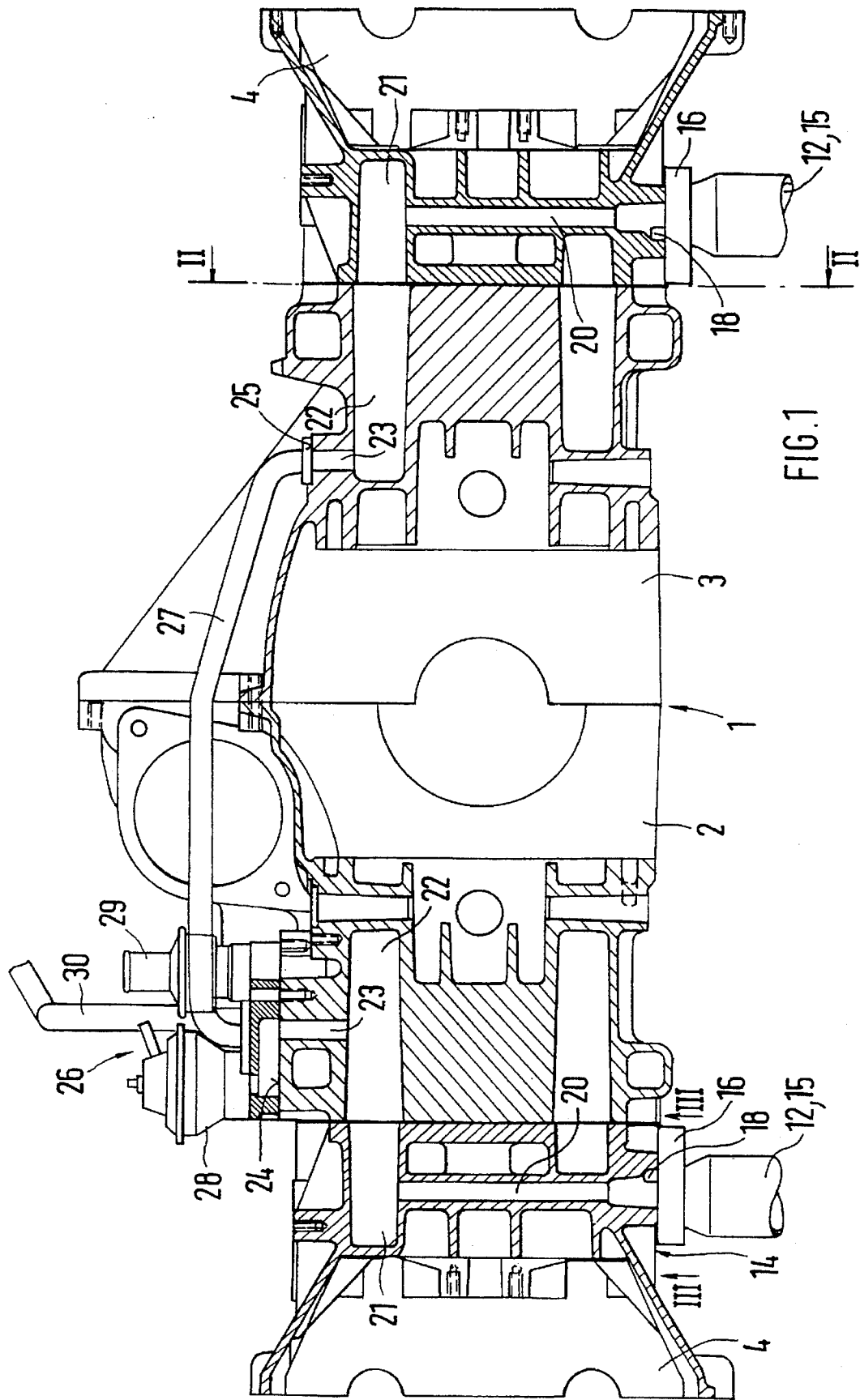
FIG. 1 is a cross section through a crankcase with flanged-on cylinder heads of an opposed cylinder engine, constructed according to a preferred embodiment of the present invention.
Figure 2:
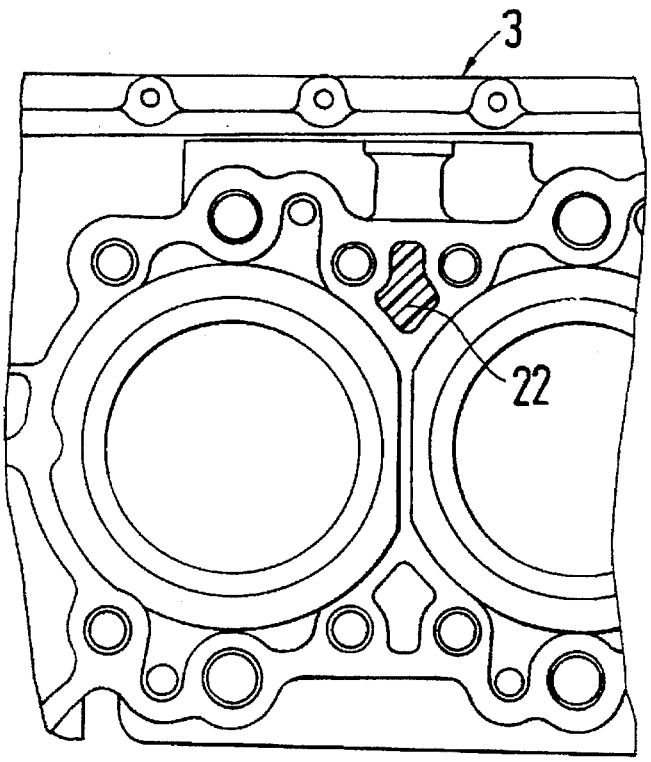
FIG. 2 is an only partially represented view of the flange face of the crankcase to the cylinder head of FIG. 1.

The internal combustion engine described in detail below is represented in the form of an opposed cylinder engine, however without limiting the invention to this. The crankcase 1 of the internal combustion engine is divided in the longitudinal direction and consists of two crankcase halves 2, 3 in open deck construction with integrated cylinder liners. These crankcase halves 2, 3 are respectively covered by a cylinder head 4, in which inlet conduits 5 and outlet conduits 6 as well as corresponding inlet valves 7 and outlet valves 8 have been integrated. The inlet conduit 5 is connected with a collecting tube 11 via a vacuum line 9, in which an injection valve 10 terminates. The throttle flap for regulating the air supply, known per se and not further shown, is embodied in this collecting tube 11. The outlet conduits 6 are connected via exhaust gas manifolds 12, which are a part of the exhaust gas installation, not further shown, with an exhaust gas catalytic converter.

Figure 3:
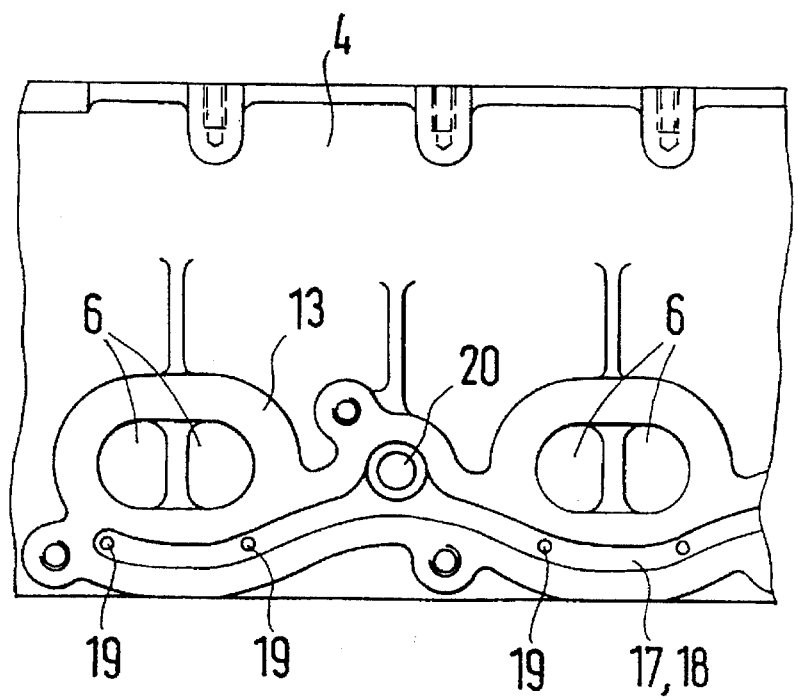
FIG. 3 is a view of the connecting face of the exhaust gas manifolds to the cylinder head of FIG. 1.
Figure 4:
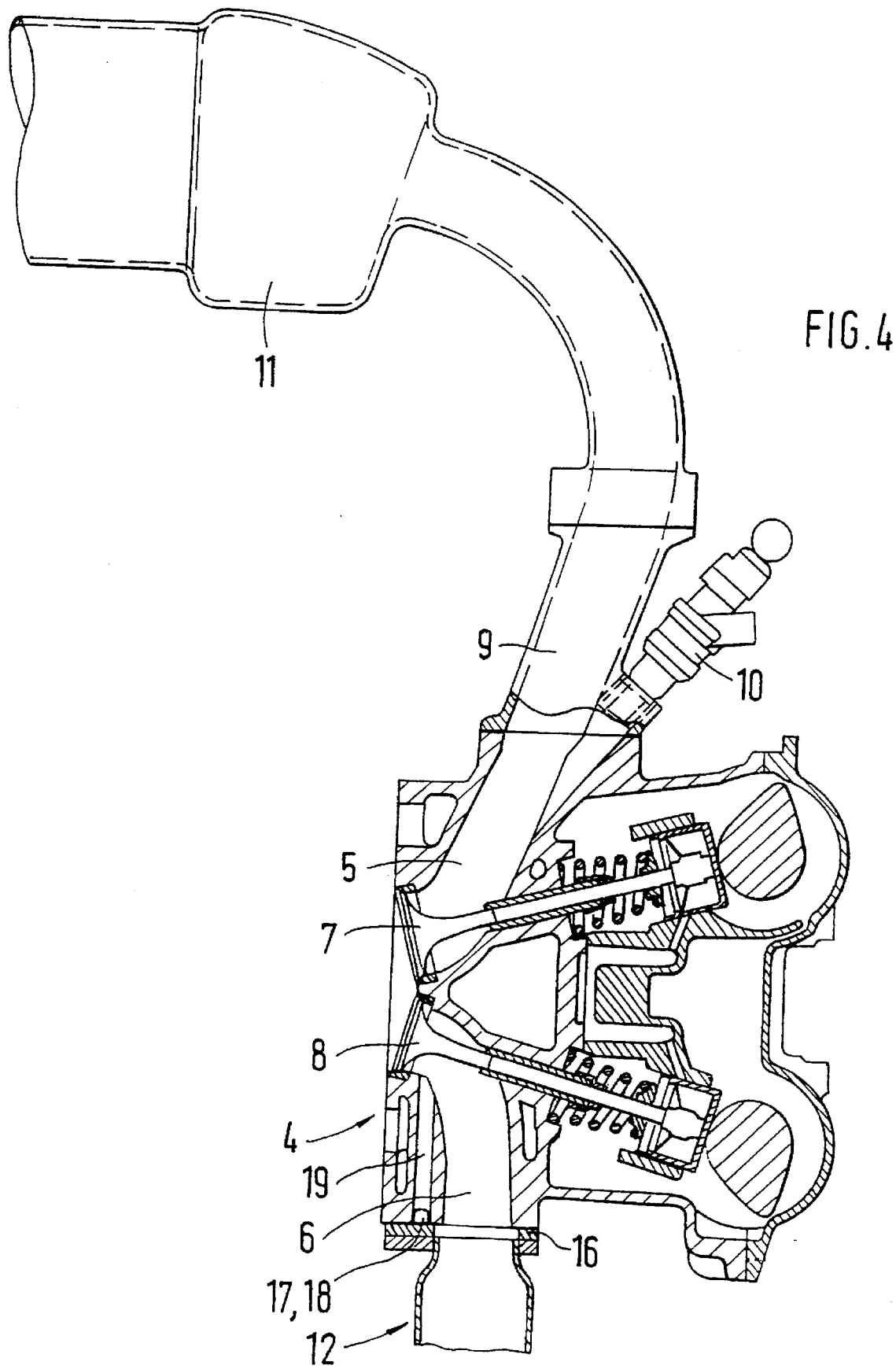
FIG. 4 is a cross section through the cylinder head of FIG. 1 with portions of the vacuum installation.
Figure 5:
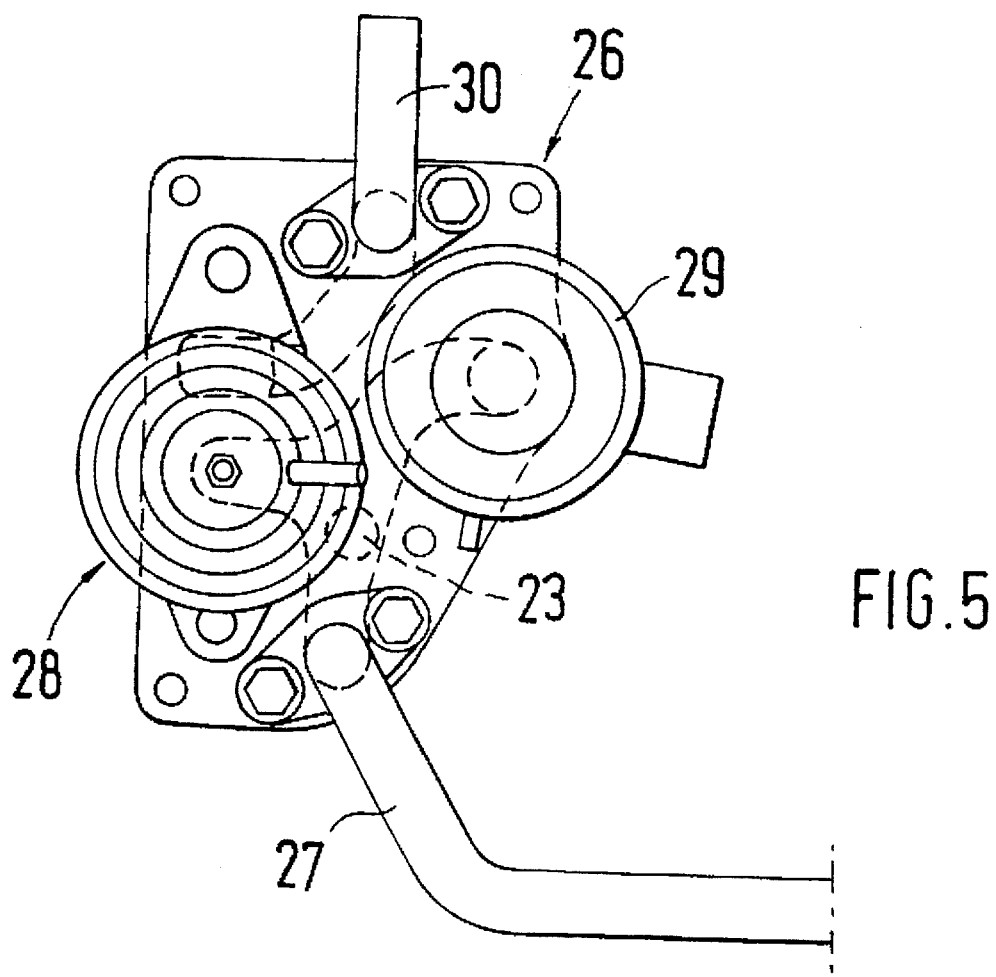
FIG. 5 is a view of the connecting face for the exhaust gas return or the secondary air valve of the engine of FIG. 1.

The outlet conduits 6, open toward the bottom, of the cylinders of each one of the two cylinder lines terminate in a common flange face 13 on the underside 14 of the cylinder head 4. The respectively two outlet conduits 6 of the second and third cylinder in the left cylinder line (FIG. 1) are represented in FIG. 3. The flange face 13 includes all outlet conduit openings of the cylinders of a line of cylinders and is used as a connecting face of a corresponding manifold unit. The altogether three manifold pipes 15 of the exhaust gas manifold 12 terminate in a common flange plate 16 resting against the flange face 13. A depression 17 has been cut into the flange face 13 which, in this exemplary embodiment, is embodied on the side of the outlet conduits 6 facing the crankcase and extends over almost the entire length of the flange face 13. This recess 17 is covered by the flange plate 16 of the exhaust gas manifold 12 and is used in the covered state as the collecting line 18. Secondary conduits 19 issue from this collecting line 18 and respectively terminate in one of the outlet conduits 6. In this exemplary embodiment these secondary conduits 19 extend in a straight line and are embodied as bores.

A connecting conduit 20 starts from the collecting line 18 which, in this exemplary embodiment, extends between the second and third cylinders of the left line of cylinders (FIG. 1), or between the fourth and fifth cylinder of the right line of cylinders, and terminates into a depression 21 cast in the cylinder head 4 and open toward the crankcase. This depression 21 makes a transition into a cast housing recess 22 embodied in the crankcase 1 or in each one of the two crankcase halves 2 or 3. It is open in the direction toward the connecting face with the cylinder head 4. In the assembled state of the internal combustion engine the connection between the depression 21 and the housing recess 22 is sealed by means of a seal, known per se, between the crankcase and the cylinder head. A bore 23, penetrating the crankcase and starting at respectively one flange face 24, 25, terminates in each one of the two housing recesses 22. A valve unit 26 is flanged to the flange face 24 shown on the left in FIG. 1. The end of a connecting line 27 is flanged to the right flange face 25, whose other end is connected with the valve unit 26.

The valve unit 26 is comprised of an exhaust gas return valve 28 (AGR valve) and a secondary air valve 29. Both valves are connected in a manner not shown with an engine control device which switches them as a function of predetermined operational conditions. In this case the secondary air valve 29 can be connected with either a secondary air pump or, as a freely vacuum-generating valve, with an air filter unit. The exhaust gas return valve 28 is connected with the vacuum installation of the internal combustion engine via a connecting line 30, i.e. there is a connection between the exhaust gas return valve 28 and the collecting tube 11 with the throttle flap, not shown. As represented here, the exhaust gas return valve 28 and the secondary air valve 29 can be embodied as individual valves. It is also contemplated to combine the valve functions in a combination valve according to certain other preferred embodiments of the invention.

During operation of the internal combustion engine the two valves 28, 29 are triggered by the control device in such a way that in the warm-up phase of the engine fresh air is aspirated or blown in via the opened secondary air valve 29, which reach the collecting lines 18 directly or via the connecting line 27, the bores 23, the housing recesses 22 or the depressions 21 connected with them. The fresh air or the secondary air reaches the outlet conduits 6 from these collecting lines 18 via the secondary conduits 19 and in this way leads to a more rapid heating of the downstream-connected catalytic converter, as previously described. The exhaust gas return valve 28 is closed during the warm-up phase, so that it does not affect anything. Following the warm-up phase, the secondary air valve 29 is closed, i.e. the input of secondary or fresh air is stopped. The exhaust gas return valve 28 is opened to a greater or lesser extent as a function of the operational state of the engine, so that a portion of the exhaust gas flow is guided into the vacuum train via the secondary conduits 19, the collecting lines 18, the depression 21 and the housing recess 22, as well as the bores 23 and the connecting line 27 through the opened exhaust gas return valve 28 and the connecting line 30. This partial return of exhaust gas into the vacuum train leads to the previously described improvement, known per se, of the exhaust gas behavior.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A multi-cylinder internal combustion engine with an aspiration and exhaust gas system and a feed device for secondary air for the exhaust gas system, comprising:

a cylinder head with at least one exhaust gas outlet conduit per cylinder, at least one respective secondary conduit integrated in the cylinder head and terminating in a respective outlet conduit, and at least one collecting line integrated into a housing of the internal combustion engine and connected with the secondary conduits, wherein the secondary conduits and the collecting line are configured to selectively accommodate both return of exhaust gas into an engine vacuum system and feed of secondary air to the exhaust gas system as a function of operational conditions of the internal combustion engine.

2. An internal combustion engine according to claim 1, wherein the collecting line is connected with one side of a secondary air valve and an exhaust gas return valve, wherein the secondary air valve has a connection with ambient air on its other side, and wherein the exhaust gas return valve is connected with the vacuum system on the other side.

3. An internal combustion engine according to claim 2, wherein the exhaust return valve and the secondary air valve are disposed on an exterior portion of the housing of the internal combustion engine.

4. An internal combustion engine according to claim 2, wherein the exhaust gas return valve and the secondary air valve are disposed on a common connecting face on the housing, and wherein there are connections from this connecting face to the collecting line and to the vacuum system.

5. An internal combustion engine according to claim 2, wherein a connecting conduit to the valves starts at the collecting line, and wherein the connecting circuit extends at least partially between two cylinder bores in the cylinder head.

6. An internal combustion engine according to claim 5, wherein the exhaust gas return valve and the secondary air valve are disposed on an exterior portion of the housing of the internal combustion engine.

7. An internal combustion engine according to claim 2, comprising two lines of cylinders, wherein the connection between the secondary conduits and the valves from a first cylinder line is completely integrated into the housing, and wherein an external line which is placed downstream of the connection fixed in the housing, leads to the valves from secondary conduits of the second line of cylinders.

8. An internal combustion engine according to claim 1, wherein the collecting line is cut into a flange face of the cylinder head, wherein the flange face is used for attaching an exhaust gas manifold, and wherein the collecting line is covered by a contact face of the exhaust gas manifold.

9. An internal combustion engine according to claim 8, wherein a connecting conduit to the valves starts at the collecting line, and wherein the connecting circuit extends at least partially between two cylinder bores in the cylinder head.

10. An internal combustion engine according to claim 9, wherein the connecting conduit terminates in a housing recess in an engine crankcase.

11. An internal combustion engine according to claim 10, wherein the housing recess is open toward the connecting face of the crankcase with the cylinder head.

12. An internal combustion engine according to claim 11, comprising two lines of cylinders, wherein the connection between the secondary conduits and the valves from a first cylinder line is completely integrated into the housing, and wherein an external line, which is placed downstream of the connection fixed in the housing, leads to the valves from secondary conduits of the second line of cylinders.

13. An internal combustion engine according to claim 8, comprising two lines of cylinders, wherein the connection between the secondary conduits and the valves from a first cylinder line is completely integrated into the housing, and wherein an external line which is placed downstream to the connection fixed in the housing, leads to the valves from secondary conduits of the second line of cylinders.

14. An internal combustion engine according to claim 1, wherein a connecting conduit to the valves starts at the collecting line, and wherein the connecting conduit extends at least partially between two cylinder bores in the cylinder head.

15. An internal combustion engine according to claim 14, wherein the connecting conduit terminates in a housing recess in the crankcase.

16. An internal combustion engine according to claim 15, wherein the housing recess is open toward the connecting face of the crankcase with the cylinder head.

17. An internal combustion engine according to claim 15, wherein a connecting bore extends between the housing recess in the crankcase and the connecting face.

18. An internal combustion engine according to claim 1, comprising two lines of cylinders, wherein the connection between the secondary conduits and the valves from a first cylinder line is completely integrated into the housing, and wherein an external line which is placed downstream of the connection fixed in the housing, leads to the valves from secondary conduits of the second line of cylinders.

19. A method of making a multi-cylinder internal combustion engine with an aspiration and exhaust gas system and a feed device for secondary air for the exhaust gas system, of the type including:

a cylinder head with at least one exhaust gas outlet conduit per cylinder, at least one respective secondary conduit integrated in the cylinder head and terminating in a respective outlet conduit, and at least one collecting line integrated into a housing of the internal combustion engine and connection with the secondary conduits, wherein the secondary conduits and the collecting line are configured to selectively accommodate both return of exhaust gas into an engine vacuum system and feed of secondary air to the exhaust gas system as a function of operational conditions of the internal combustion engine, said method comprising cutting the collecting line into a flange face of the cylinder head, wherein the flange face is used for attaching the exhaust gas manifold, and wherein the collecting line is covered by a contact face of the exhaust gas manifold.

20. A method according to claim 19, wherein a conducting conduit to the valves starts at the collecting line, and wherein the connecting circuit extends at least partially between two cylinder bores in the cylinder head.

21. A multi-cylinder internal combustion engine arrangement comprising a cylinder head having an exhaust gas outlet conduit, a secondary conduit terminating in the exhaust gas outlet conduit, and a collecting line connected with the secondary conduit, wherein the secondary conduit and collecting line are formed in the cylinder head and are configured to accommodate selective use thereof based on engine operating conditions as both an exhaust gas return line returning a portion of exhaust gases to an exhaust gas return valve and a secondary air feed line feeding secondary air from a secondary air valve to the exhaust gas outlet conduit.

22. An engine arrangement according to claim 1, wherein the secondary conduit and collecting line are formed integrally in the cylinder head.

* * * * *